United States Patent [19]

Layton

[11] Patent Number: 4,466,454
[45] Date of Patent: Aug. 21, 1984

[54] AUTOMATED WORK TRANSFER SYSTEM
[75] Inventor: Howard M. Layton, New Fairfield, Conn.
[73] Assignee: Interlab, Inc., Danbury, Conn.
[21] Appl. No.: 443,894
[22] Filed: Nov. 23, 1982
[51] Int. Cl.³ .............................................. B08B 3/04
[52] U.S. Cl. ...................................... 134/76; 134/82; 134/140; 98/115 LH
[58] Field of Search .............................. 134/62, 76–77, 134/82, 140; 98/115 LH; 312/209

[56] References Cited

U.S. PATENT DOCUMENTS 3,335,839  8/1967  Neumann ......................... 134/76 X
4,377,986  3/1983  Juve .................................. 134/76 X

*Primary Examiner*—Robert L. Bleutge
*Attorney, Agent, or Firm*—Michael Ebert

[57] ABSTRACT

An automatic work transfer system for conveying a basket carrying work through a row of processing stages at a work station in any desired sequence. The basket is lowered into a tank at each stage and oriented therein for processing for a predetermined dwell period, at the conclusion of which the basket is hoisted out of the tank and transferred to the next stage where the procedure is repeated. The system includes a supporting rail laterally displaced from the row of stages and parallel thereto. Riding on the rail is a robot provided with a pair of vertical shafts supported on an elevator. Cantilevered from the shafts are a pair of arms which extend over the stages, the ends of the arms being pivotally connected to a cross piece. Depending from the center of the cross piece is a rod terminating in a hand adapted to engage the handle of the basket. Thus when the robot advances on the rail the hand is then shifted along a horizontal X-axis to a position in general alignment with a selected stage, when the elevator is operated the hand is raised or lowered with respect to the selected stage along a vertical Y-axis normal to the X-axis; and when the shafts are simultaneously rotated, the hand swings, but without rotation, relative to a Y-axis perpendicular both to the X and Y axis to orient the basket with respect to the stage. Separately controllable X, Y and Z motors are subject to programmed instructions appropriate to the processing to be carried out.

7 Claims, 5 Drawing Figures

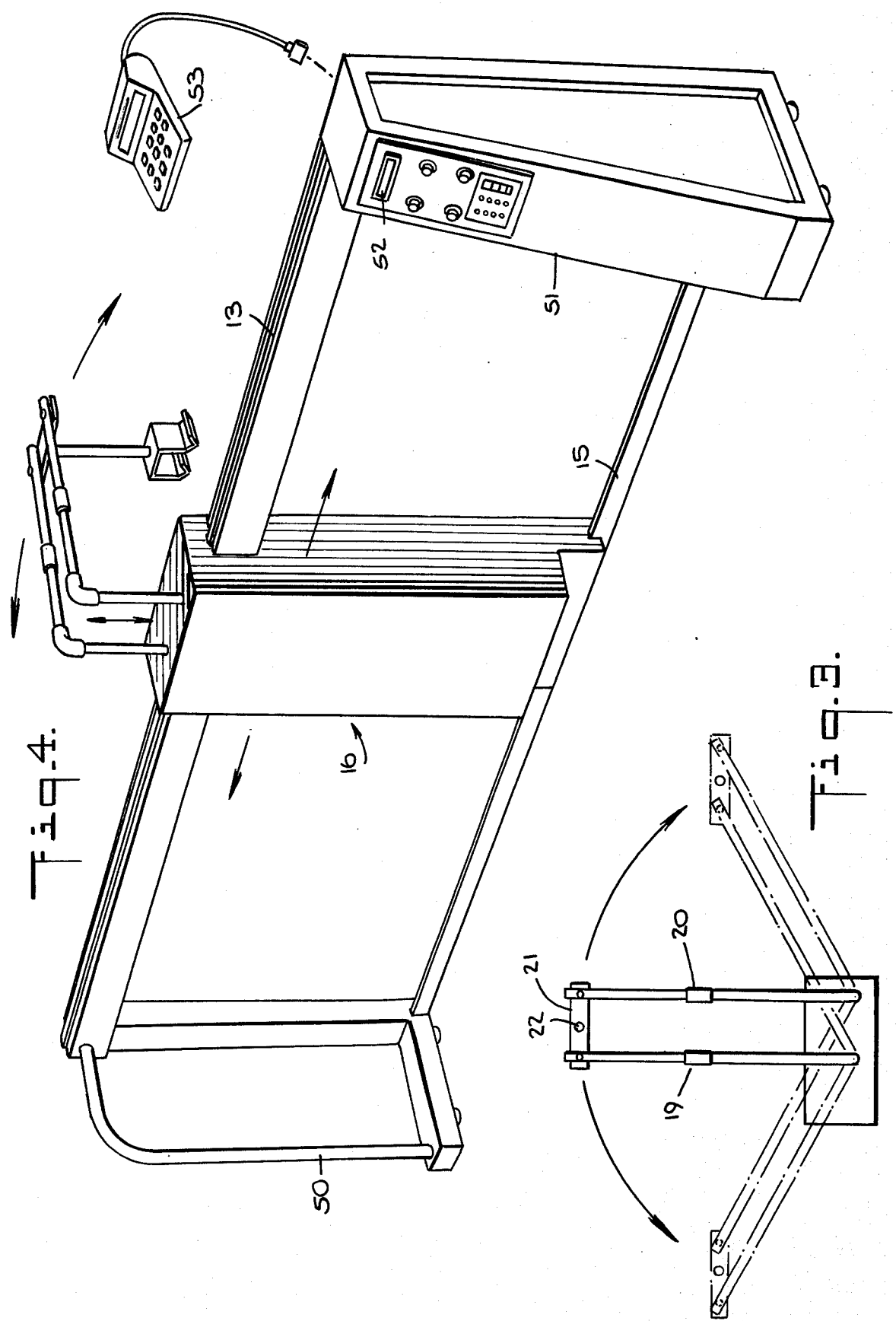

AUTOMATED WORK TRANSFER SYSTEM

BACKGROUND OF INVENTION

This invention relates generally to mechanical transfer mechanisms for conveying work at a work station from one stage to another, and in particular to an automated work transfer system for conveying a basket carrying work through a row of processing stages in any desired sequence, the stages being of the type involved in the fabrication of microelectronic devices.

By using diffusion techniques it is now possible to fabricate transistors and diodes as well as resistors and capacitors without a single wafer of silicon to create integrated circuits. The manufacture of microelectronic devices involves sequences of photolithography, etching and critical cleaning processes. For the most part, these have heretofore been carried out manually at chemistry work benches. In the usual manufacturing procedure, batches of substrates or silicon wafers are carried in "boats" and transferred from one chemical tank to another by a human operator who adjusts the conditions prevailing in each tank and also determines the periods during which the boat dwells in the respective tanks for treatment therein.

While automated transfer operations are now commonplace in many industrial processes including electroplating, there are a number of practical factors which have militated against the introduction of automation in the processing of microelectronic devices. A major factor is that the value of the microelectronic devices is high relative to the cost of labor involved in making these parts. Thus the introduction of automated work transfer mechanisms to reduce labor costs may not be economically justified, particularly when one takes into account the capital investment dictated by automated equipment.

But other factors now come into play which have little to do with the cost effectiveness of replacing manual operations with automated work transfer mechanisms. As microelectronic devices become increasingly complex and sophisticated, the associated wet chemistry procedures are rendered even more critical. As a consequence, the variable and human errors incidental to manual operation can no longer be tolerated, for repeatability and consistency are now the primary desiderata. Hence these considerations now override the cost effectiveness factor.

Though efforts have been made to automate work transfer operations in wet chemistry processing of microelectronic devices, they have had limited success, largely because of certain environmental problems. Many of the chemical processing tanks discharge corrosive vapors into the region of the work station. In the typical wet chemistry bench, the arrangement is such as to create an air curtain to isolate the corrosive environment at the work station from the external room environment. Since automated work transfer mechanisms of the type heretofore proposed are arranged to operate within the corrosive environment at the work station, special expedients have been required to cope with this environment.

Thus, it has heretofore been the practice to employ corrosion-resistant materials in the manufacture of automated work transfer mechanisms for wet chemistry benches. And to achieve satisfactory and reliable performance, it has also been necessary to purge the housings for the motors which drive the transfer mechanism with nitrogen or external air to exclude corrosive fumes from the motor components.

But such expedients have failed to entirely solve the problem; for while it is possible to protect the transfer mechanism from chemical attack by using corrosion-resistant plastics, one must also isolate the chemical process from contamination by the mechanism, for particulate matter from the mechanism and lubricants used therein may fall or seep into the tanks and thereby contaminate the process. Such contamination may result in defective microelectronic parts and therefore can be quite costly.

SUMMARY OF INVENTION

In view of the foregoing, the main object of this invention is to provide an improved automated work transfer system for conveying a basket carrying work through a row of chemical processing stages in a work station in any desired sequence, the system including a robot whose hand is adapted to grasp the handle of the basket and to manipulate the basket in accordance with programmed instructions.

A significant feature of the invention resides in the fact that the entire transfer mechanism, but for the robot hand and its supporting arms, lies outside of the corrosive environment of the work station and need not, therefore, be protected against corrosion. This makes feasible a much less expensive mechanism and obviates the need for protection against chemical attack. And because in the present system, the mechanism does not operate in the environment of the work station, particulate matter and lubricants released from the mechanism do not enter and contaminate the work station.

More particularly, an object of the invention is to provide a system of the above-type in which the robot's hand is moveable in the X, Y and Z directions, making it possible not only to lower or raise the basket into and out of the tank at each stage of the work station, and to transfer the basket from stage to stage, but also at each stage to orient the basket in the tank so that it occupies the preferred position therein.

Also an object of this invention is to provide a system of the above type in which hand movement in the X, Y and Z directions is effected by separately controllable motors that are subject to programmed instructions appropriate to the processing being conducted at the work station, the program being readily changeable so that the same system may be used with different processes.

Yet another object of the invention is to provide a system which operates efficiently and reliably with minimum maintenance, which system may be integrated into a wet chemistry work bench or retrofitted into an existing manual work bench to automate its operation.

Briefly stated, these objects are attained in an automatic work transfer system for conveying a basket carrying work through a row of processing stages at a work station in any desired sequence. The basket is lowered into a tank at each stage and oriented therein for processing for a predetermined dwell period, at the conclusion of which the basket is hoisted out of the tank and transferred to the next stage where the procedure is repeated. The system includes a supporting rail laterally displaced from the row of stages and parallel thereto. Riding on the rail is a robot provided with a pair of vertical shafts supported on an elevator. Cantilevered from the shafts are a pair of arms which extend over the stages, the ends of the arms being pivotally connected to a cross piece. Depending from the center of the cross piece is a rod terminating in a hand adapted to engage the handle of the basket. Thus when the robot advances on the rail the hand is then shifted along a horizontal X-axis to a position in general alignment with a selected stage, when the elevator is operated the hand is raised or lowered with respect to the selected stage along a vertical Y-axis normal to the X-axis; and when the shafts are simultaneously rotated, the hand swings but, without rotation, relative to a Y-axis perpendicular both to the X and Y axis to orient the basket with respect to the stage. Separately controllable X, Y and Z motors are subject to programmed instructions appropriate to the processing to be carried out.

OUTLINE OF THE DRAWINGS

For a better understanding as well as other objects and further features thereof, reference is made to the following detailed description to be read in conjunction with the accompanying drawings, wherein:

FIG. 3 is a top view of the robot;

FIG. 4 is a perspective view of a free-standing transportable work transfer system in accordance with the invention which is attachable to an existing manual wet chemistry work bench to automate its operation.

DESCRIPTION OF THE INVENTION

The General Arrangement

Figures 1, 5:
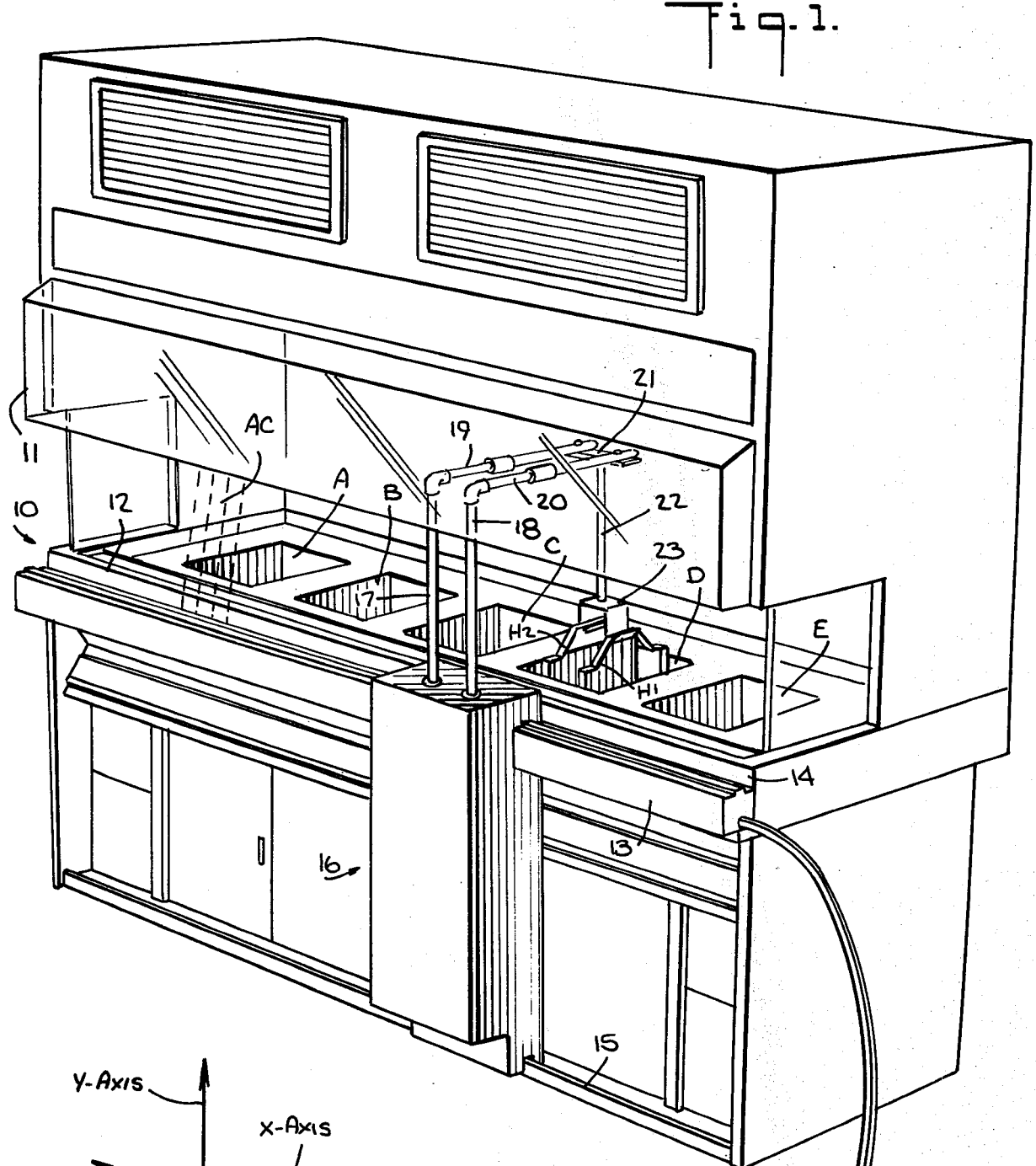
FIG. 1 is a perspective view of a typical wet chemistry work station which incorporates an automated work transfer system having a robot in accordance with the invention.
FIG. 5 schematically illustrates the X-Y-Z axes of hand movement.

Referring now to FIG. 1, there is shown a wet chemistry work station provided with a work bench 10 of conventional design on which is a row of chemical processing stages A, B, C, D and E, each having a tank adapted to receive a basket carrying the work to be processed. The number and nature of the chemical processing, and its operating sequence form no part of the present invention.

Because of vapors emitted from the tanks, the atmosphere in the region above the tanks is corrosive. This region is isolated from the external environment by a vertical air curtain AC created by a high velocity laminar air stream projecting downwardly from a transparent front hood 11 into an exhaust slot 12 extending along the front of the bench. This air curtain effectively isolates the contaminated work environment from the external environment.

The invention is operable with any isolating air curtain such as that existing in a typical fume exhaust hood in which openings and the rear of the work station have the effect of drawing all air from the work environment into rear exhaust slots and ducts, this air in turn being replaced by a stream of air drawn from in front of the station to create an air curtain thereacross. A significant feature of the present invention is that all components of the work transfer system lie within the external atmosphere except the arms cantilevered from the robot which support a hand holding the work basket.

Because only the cantilevered arms and the hand supported thereby are exposed to a corrosive atmosphere, these components may be made of a non-reactive metal such as titanium or of stainless steel clad with a protective plastic coating, such as Teflon (PTFE).

The system includes a supporting rail 13 secured to the front upper edge 14 of the work bench so that the rail is outside air curtain AC and is laterally displaced from the row of stages, the rail running parallel to the row. Mounted against the front lower edge of the work bench is a guide rail 15.

Riding along these rails is a robot 16 which is fully encased but for a pair of vertical shafts 17 and 18 extending above the head of the robot from which a pair of arms 19 and 20 are cantilevered which pierce air curtains A-C and extend into the atmosphere of the work station. The ends of arms 19 and 20 are bridged by a cross piece 21 pivotally connected thereto. Depending from the center of cross piece 21 is a rod 22 terminating in a hand 23.

Hand 23 is formed by a U-shaped plate whose flat fingers have V-shaped tips which function as hooks to engage the double handles $H_1$ and $H_2$ of a basket 24 carrying work 25 to be processed in the various stages of the work bench. To engage the handles, the fingers of the hand are brought under the handles and then raised. The reverse procedure is used for disengagement.

As will be later explained in detail, robot 16 is provided with three separately controlled drive means, the first serving to advance the robot along the supporting rail 13 to cause hand 23 to be generally aligned with a selected stage of the work bench. Thus the first drive means acts to shift hand 23 along a horizontal X axis as indicated in FIG. 5. The second drive means acts to raise or lower hand 23 which holds the work basket to bring it out of or into the tank of the stage with which the hand is aligned. This action occurs along a vertical Y axis normal to the X-axis.

The third drive means acts to simultaneously rotate shafts 17 and 18, thereby causing the cantilever arms and the connecting cross piece to function as a pantograph, making the hand swing with respect to a Z axis perpendicular both to the X and Y axes, thereby orienting the hand with respect to the tank.

Because the system effects control of hand movement in the X-Y and Z directions, it becomes possible not only to advance the hand to carry the basket to any one of the tanks and to lower the basket into the selected tank and to thereafter hoist it out of the tank but also to orient the immersed basket in the tank, so that it occupies a correct processing position therein. The three separately controllable drive means are linked to a programmable microcomputer 26 and a power supply 27 which may be mounted on the console of the work bench or placed at a remote location.

Thus if in a given procedure, the work basket must first be immersed in tank A for five minutes, followed by sequential immersion in tanks B, C and D for eight minutes, after which the basket is again immersed in tanks D and E for six minutes each, and the basket is to occupy particular positions in the tanks, the program set up for this treatment is such as to cause the motors to make the number of revolutions or fractions thereof necessary to exactly execute the desired program. The program may also take into account process variables, such as fluctuations in the temperature of the bath within a tank which may be sensed to vary the dwell period.

In practice, the computer may be provided with program cards to supply the necessary instructions for different predetermined programs, or with a key board for entering new programs or modifying existing programs.

The Robot

Figure 2:
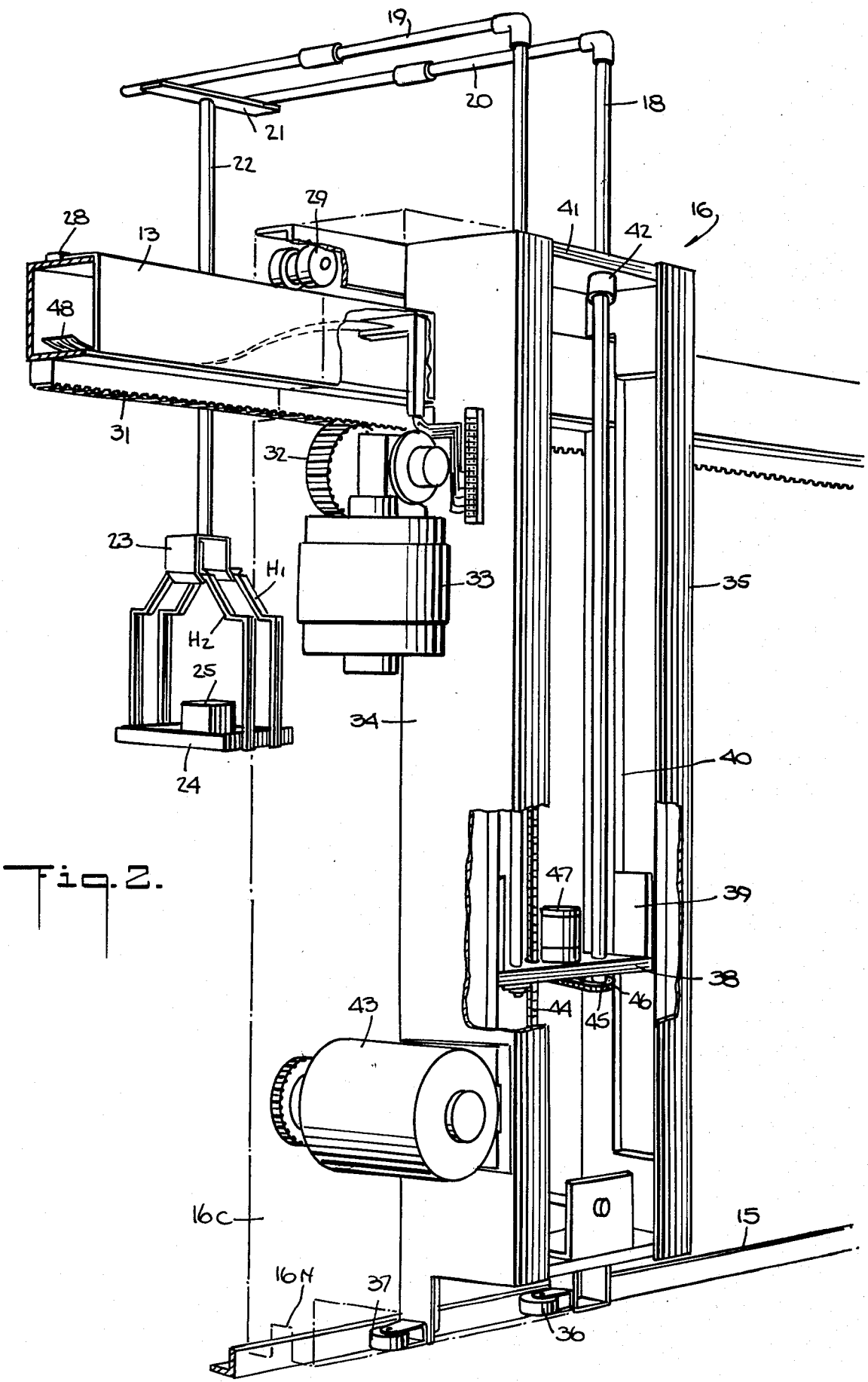
FIG. 2 is a perspective view of the robot.

Referring now to FIG. 2 showing the details of robot 16, it will be seen that supporting rail 13 is hollow and has a rectangular cross-section. Welded to the upper face of rail 13 along the center line thereof is a strip 28 serving as a guide for a free-running wheel 29 which is provided with an annular center groove 30 to accommodate the strip.

Secured to the underface of rail 13 is a longitudinally-extending rack 31. Rack 31 is engaged by a pinion 32 driven by an X-axis motor 33. Motor 33 is mounted on the side of a carriage formed by parallel vertical beams 34 and 35 to whose lower ends are attached rollers 36 and 37 that run against guide rail 15. It will be seen that guide rail 15 has an L-shaped cross section and that the case 16C of the robot has a notch 16N therein which receives the vertical flange of the guide rail.

Parallel beams 34 and 35 of the carriage define an elevator shaft within which is received the platform 38 of an elevator. The platform is provided with side shoes 39 which ride freely in slide bearings 40 formed in the beams. The vertical shafts 17 and 18 are supported on elevator platform 38 and extend through the roof 41 of the carriage through bearings 42.

The elevator is raised or lowered on the Y-axis by drive motor 43 through a link chain 44. The lower end of shaft 18 has a sprocket wheel 45 keyed thereto, this being linked by a sprocket belt 46 to a Z-axis motor 47.

All motors are of the D-C type and therefore turn in a direction determined by the polarity of the applied direct voltage. The motors are connected by a flat cable 48 extending through supporting rail 13 to the programmed microcomputer which feed D-C power from a power supply to the respective motors in a polarity and for a duration sufficient to produce the number of motor revolutions in a direction necessary to execute the program for a given processing procedure.

Thus the X-axis motor 33, when energized, will advance the robot carriage to the left or right to a point at which hand 23 is in general alignment with a selected stage of the work bench. Then when Y-axis motor 43 is energized, it will act to lower hand 23 and the work basket held thereby into the tank of the selected stage. Energization of Z-axis motor 47 causes the basket in the tank to assume the desired position thereon.

As shown in FIG. 3, the cantilevered arms 19 and 20 pivotally linked together by cross piece 21 act as a pantograph to swing the position of the hand which depends from the center of the cross piece in an arc relative to the Z axis.

Free Standing Structure

In the free standing structure shown in FIG. 4, the rails 13 and 15 along which robot 16 rides, is supported on one end by a wheeled stand 50 and on the other end by a wheeled console 51 which houses the power supply and the computer for the robot.

The console includes a slot 52 into which one inserts the program card for a given process. Associated with the console is a plug-in-keyboard 53 for entering program instructions. In practice, the power supply may take the form of a rechargeable battery so that when the system is transported to a work bench site, it is not necessary to extend a power cable thereto.

The length of the rails is sufficient to accommodate the system to the typical wet bench. Hence all that one need do in order to retrofit an existing manual wet bench to the automatic system is to roll the free-standing structure to a position against the work bench and to provide a program appropriate to this bench.

While there have been shown and described preferred embodiments of an automated work transfer system, in accordance with the invention, it will be appreciated that many changes and modifications may be made therein without, however, departing from the essential spirit thereof.

Thus while in the arrangement illustrated, robot 16 rides on a supporting rail 13 secured to the front edge 14 of the work bench and is guided by a guide rail 15 placed at the front lower edge, in practice the robot may depend from a supporting rail secured to the lower front edge of a laminar flow clean hood or other structure positioned above the work bench, in which case the guide rail for the robot would be at the upper front edge. The robot in this overhead arrangement would be outside of the corrosive environment and would operate in all other respects in the manner described in the specification. Alternatively, instead of riding along the front side of the work bench, the robot may be arranged to ride on the rear side thereof, the robot again being outside of the corrosive environment, with the cantilevered arms extended therefrom to hold the work basket.

In some instances, in addition to movement of the work basket in the X, Y and Z directions as disclosed herein, it is desirable to rotate the basket within the tank so as to further orient the work to a desired position. In the arrangement illustrated in the drawing, vertical rod 22 which supports the work basket is rigidly secured to cross piece 21 to preclude rotation thereof. In order, therefore, to effect rotation of the rod and the work basket held thereby, the rod is then supported for rotation by a bearing in cross piece 21, means being provided to effect the desired rotation thereof.

Such means could take the form of an endless sprocket chain linking a sprocket wheel on rod 22 to a sprocket wheel on a third vertical shaft extending above robot 16 between shafts 17 and 18. This third shaft could be motor-controlled, subject to an appropriate computer program or by a manual setting means. The motor for this purpose is preferably a stepping motor whose armature is steppable to any desired angular position.

I claim:

1. In combination with a work station provided with a bench having a row of chemical processing stages thereon each having a tank adapted to receive a basket carrying the work, the atmosphere above the stages being corrosive and being isolated from the external atmosphere by an air curtain; an automated work transfer system to convey said basket in a desired sequence to said stages, said systems comprising:
   A. a supporting rail laterally displaced from said row of stages and parallel thereto; and
   B. a robot riding on said rail provided with a vertical shaft having an arm cantilevered therefrom and extending into the corrosive atmosphere to support a hand holding the basket whereby the robot otherwise lies in the external atmosphere and is isolated from the corrosive atmosphere, said robot further including first drive means to advance the robot along the rail to a position aligning the hand with a selected stage and second drive means to lower or raise the shaft to lower the basket held by the hand into the tank of the selected stage or to hoist it therefrom.

2. The combination as set forth in claim 1 wherein the system further includes a guide rail parallel to the supporting rail.

3. A system as set forth in claim 1 further including a second vertical shaft parallel to the first shaft, said second shaft having an arm cantilevered therefrom, the ends of the arms being bridged by a cross-piece pivotally connected thereto, said hand being attached to a rod depending from the center of the cross piece whereby when said shaft is rotated, said arm is caused to swing, to orient said basket in the selected tank and third drive means to rotate one of said shafts.

4. A system as set forth in claim 3 further including computer means operatively coupled to said first, second and third drive means and programmed to cause said system to convey said basket to said stages in a selected sequence, the basket at each stage being lowered into said tank and being oriented therein, the basket after a predetermined dwell period being hoisted out of the tank.

5. A system as set forth in claim 4 wherein said first drive means is constituted by a rack secured to the underside of the supporting rail and a first motor secured to said robot for rotating a pinion engaging the rack.

6. A system as set forth in claim 4 wherein said second drive means is constituted by an elevator for supporting the shafts and a second motor to raise or lower the elevator.

7. A system as set forth in claim 4 wherein said drive means is constituted by a third motor coupled by a sprocket chain to a sprocket wheel keyed to one of said shafts.

* * * * *